(12) United States Patent
Umeda et al.

(10) Patent No.: US 8,236,183 B2
(45) Date of Patent: Aug. 7, 2012

(54) METHODS AND SYSTEMS FOR FILTRATION

(75) Inventors: Toru Umeda, Tsukuba (JP); Steven C. Chisolm, Huntington, NY (US)

(73) Assignee: Pall Corporation, Port Washington, NY (US)

( * ) Notice: Subject to any disclaimer, the term of this patent is extended or adjusted under 35 U.S.C. 154(b) by 908 days.

(21) Appl. No.: 11/629,980

(22) PCT Filed: Jul. 1, 2005

(86) PCT No.: PCT/US2005/023615
§ 371 (c)(1),
(2), (4) Date: Nov. 8, 2007

(87) PCT Pub. No.: WO2006/014380
PCT Pub. Date: Feb. 9, 2006

(65) Prior Publication Data
US 2008/0128369 A1    Jun. 5, 2008

Related U.S. Application Data

(60) Provisional application No. 60/584,493, filed on Jul. 2, 2004.

(51) Int. Cl.
*B01D 29/62* (2006.01)
*B01D 33/68* (2006.01)
*B01D 29/86* (2006.01)

(52) U.S. Cl. ........ 210/769; 210/797; 210/409; 210/188; 210/143; 210/321.69; 210/416.1

(58) Field of Classification Search .................. None
See application file for complete search history.

(56) References Cited

U.S. PATENT DOCUMENTS

| | | | |
|---|---|---|---|
| 4,222,871 A | 9/1980 | Lefeuvre | |
| 5,209,852 A | 5/1993 | Sunaoka et al. | |
| 5,248,424 A | 9/1993 | Cote et al. | |
| 5,643,455 A | 7/1997 | Kopp et al. | |
| 5,665,230 A * | 9/1997 | Bradford | 210/305 |
| 5,900,143 A * | 5/1999 | Dalton et al. | 210/192 |
| 5,944,997 A | 8/1999 | Pedersen et al. | |
| 6,331,251 B1 | 12/2001 | Del Vecchio et al. | |
| 6,423,216 B1 * | 7/2002 | Yum et al. | 210/150 |

(Continued)

FOREIGN PATENT DOCUMENTS

JP    62-087206 A    4/1987

(Continued)

OTHER PUBLICATIONS

US 6,210,582, 04/2001, Del Vecchio et al. (withdrawn)

*Primary Examiner* — Krishnan S Menon
(74) *Attorney, Agent, or Firm* — Leydig, Voit & Mayer, Ltd.

(57) ABSTRACT

Methods and systems for filtration are disclosed. A feed mixture including at least one liquid component and at least one solid component and a flow of gas may be directed to a filter element and filtrate and gas may be passed through a filter medium from a feed fluid side to a filtrate side. The gas loosens and removes foulants accumulating within and on the upstream surface of the filter medium. The gas and filtrate may be separated from one another after passing through the filter medium.

5 Claims, 3 Drawing Sheets

U.S. PATENT DOCUMENTS

| | | |
|---|---|---|
| 6,454,871 B1 | 9/2002 | Labib et al. |
| 6,547,968 B1 | 4/2003 | Rabie et al. |
| 6,555,005 B1 | 4/2003 | Zha et al. |
| 6,616,843 B1 | 9/2003 | Behmann et al. |
| 6,620,319 B2 | 9/2003 | Behmann et al. |
| 7,014,770 B2 | 3/2006 | Umezawa et al. |
| 2001/0052494 A1 | 12/2001 | Cote et al. |
| 2004/0016705 A1 | 1/2004 | Umezawa et al. |
| 2005/0194315 A1* | 9/2005 | Adams et al. ............ 210/636 |
| 2005/0218074 A1* | 10/2005 | Pollock .................... 210/637 |

FOREIGN PATENT DOCUMENTS

| | | |
|---|---|---|
| JP | 63-302910 A | 12/1988 |
| JP | 2003-334565 A | 11/2003 |
| WO | WO 03/018180 A2 | 3/2003 |

* cited by examiner

METHODS AND SYSTEMS FOR FILTRATION

DISCLOSURE OF THE INVENTION

The present invention relates to methods and systems for filtering mixtures of liquids and solids by passing the mixtures through porous filter media. In particular, the present invention is directed to methods and systems for filtering mixtures of liquids and solids and maintaining the permeability of the filter media. For example, methods and systems embodying the invention may be used to remove foulant materials, such as solids, deposited on or within the filter media while filtering the mixture.

In accordance with one aspect of the invention, methods of filtration may comprise filtering a feed mixture including at least one liquid component and at least one solid component. Filtering the feed mixture may include directing the feed mixture to a feed side of a filter medium and passing the liquid component as filtrate from the feed side through the filter medium to a filtrate side of the filter medium. The methods may further comprise introducing a gas into the feed mixture, directing a flow of the gas along the feed side of the filter medium, and passing at least a portion of the gas with the filtrate through the filter medium from the feed side to the permeate side, all while filtering the feed mixture. Directing a flow of gas along the feed side of the filter medium may include sweeping the gas along at least 50% of the upstream surface of the feed side to scour the surface and loosen accumulated solids from the feed side of the filter medium. Passing at least a portion of the gas through the filter medium may include passing at least 50% of the gas introduced into the feed mixture through the filter medium. The methods may also comprise separating the gas and the filtrate.

Filtration methods and systems in accordance with the present invention offer many advantages. For example, the present method and system effectively reduces or prevents the accumulation of solids, e.g., foulants, on a filter element and prevents solids which may accumulate, e.g., a "filter cake", from densely packing against the filter element. By directing gas along and through the filter medium as the fluid being filtered passes through the medium, the present method and system effectively disrupts the accumulation of solids on or within the filter medium, for example, by loosening, lifting and/or dislodging the solids material. By reducing the accumulation of solids and preventing solids from densely packing against the filter element, the present method and system prevents the solids from substantially altering the filtration characteristics of the element so that the desired level of filtration can be achieved. Additionally, the present method and system prevents an accumulation of solids which make it harder to force filtrate through the element, e.g., a densely packed filter cake, so that the fluid to be filtered more easily passes through the filter element, enhancing the performance of the filtration system. In addition, the method and system effectively obtain this result without damaging delicate filter media and with low levels of energy consumption. Accordingly, filtration methods and systems in accordance with the present invention may be operated for extended periods of time without fouling. Methods and systems embodying the invention may also be effectively utilized in combination with other fluid regeneration methods.

DESCRIPTION OF EMBODIMENTS

While many different filtration methods and systems may embody the invention, in one example, a feed mixture, including at least one liquid component and at least one solid component, and a gas stream are directed to flow through a filter element which includes a filter medium. The feed mixture may include any type of liquid-solid mixture and the present invention is particularly advantageous for filtering mixtures having a high solids content, e.g., slurries, such as polishing slurries, polymer toner dispersions, and metal powder dispersions. The gas stream may comprise any gas or mixture of gases compatible with the feed mixture. Exemplary gases include inert gases, such as argon and nitrogen, as well as other gases, including air and oxygen.

Figure 1:
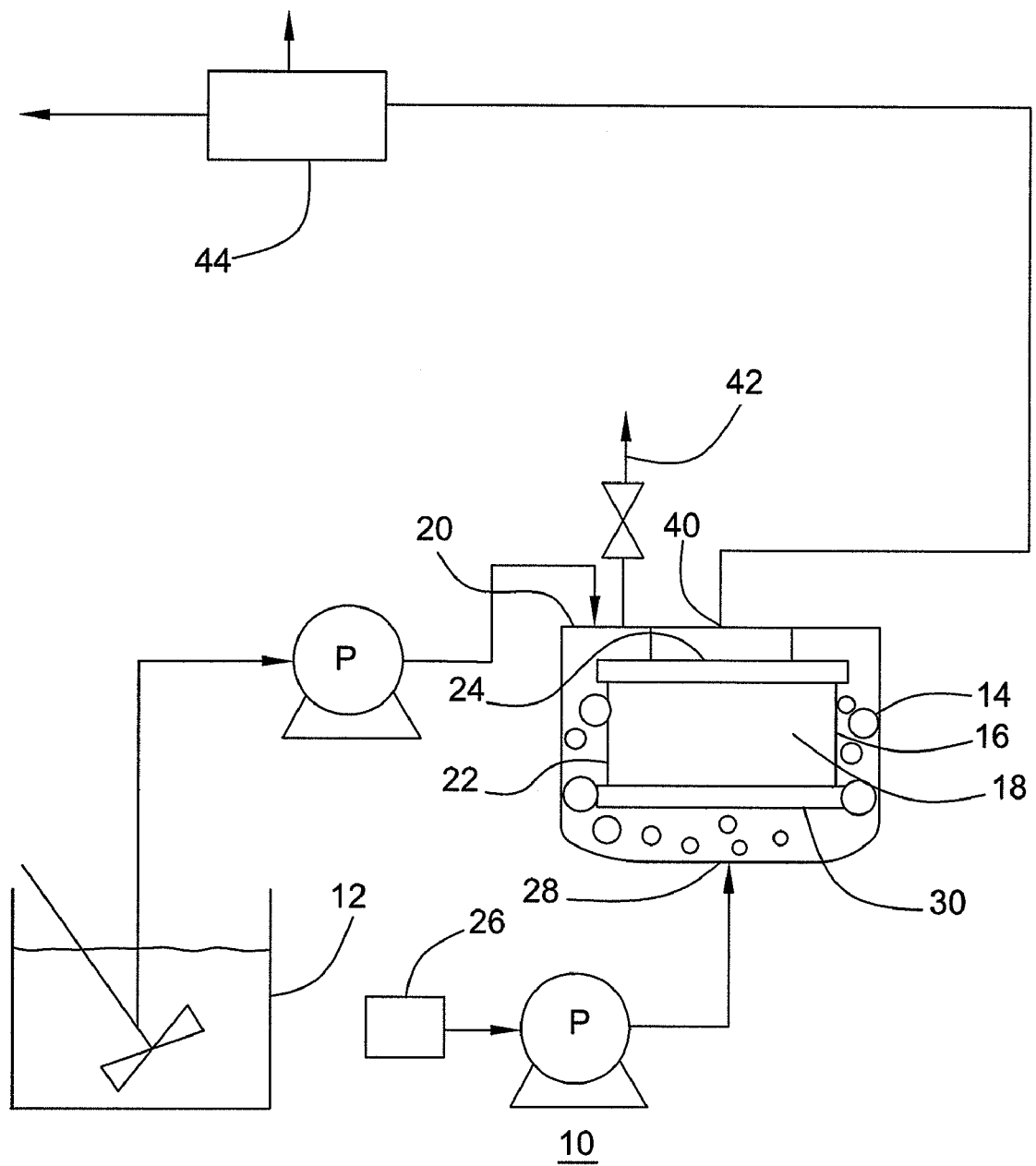
FIG. 1 is a schematic drawing of a filtration system.

Using the exemplary filtration system 10 illustrated in FIG. 1 for reference, the method may include directing a feed mixture from a feed source 12 to a filter assembly 14 including one or more filter elements 16 each having a filter medium 18. The feed mixture may be directed through a feed inlet 20 of the assembly 14 and the feed mixture may flow outside-in or inside-out through each filter element 16. In the illustrated embodiment, fluid flows from the outside-in through the filter element 16. The feed mixture preferably contacts the outside, e.g., the upstream side, of the filter element 16 and filtrate preferably flows through the filter medium 18 from a feed side 22 to a filtrate side 24 along a filtrate flow path. As the filtrate flows through the filter medium 18, material, e.g., foulants, may accumulate on or within the filter medium 18.

Continuously or periodically, the gas may be directed from a gas source 26 to the filter assembly 14 through a gas inlet 28 while the feed mixture is being directed to the filter assembly 14. For example, gas may be directed to the filter assembly 14 for substantially the entire time filtration is being performed or intermittently, e.g., every 5, 10, 15, 30 or 60 minutes, twice-daily, daily, etc. The gas may be introduced in a pulsed manner, e.g., as short bursts, for longer durations or as a continuous stream.

In some embodiments, the gas may be introduced to the filter assembly along with the feed mixture, e.g., at substantially the same time as the feed mixture. The filtration system may include a valve arrangement coupled to the filter assembly to facilitate the introduction of the gas along with the feed mixture. The valve arrangement may have any suitable configuration. For example, the valve arrangement may couple a feed inlet valve and a gas inlet valve. In some embodiments, a valve arrangement may also include a controller 31, as seen in the exemplary filter assembly illustrated in FIG. 2.

The gas preferably flows and distributes along the upstream side of the filter element 16, e.g., along the upstream surface of the filter element. For example, the gas may flow along about 50% or more or about 75% or more or about 90% or more or about 99% or more of the upstream surface of the filter element 16. Higher percentages may be more advantageous. As the gas flows and distributes along the upstream side of the filter element, the gas may loosen and/or dislodge solids material adhering to the filter medium and/or inhibit the accumulation of solids material on or within the filter medium. For example, the gas may scour the surface of the filter element, lifting solids from the surface of the element and disrupting the formation of a "filter cake". In some embodiments, the gas at the surface of the filter element may not completely prevent solids from accumulating, but may reduce the accumulation and/or may prevent any accumulated solids from densely packing against the filter element, yielding a loose, more porous filter cake. The fluid to be filtered may more readily pass through this loose, porous filter cake, increasing fluid flow and decreasing the pressure drop through the filter assembly. Thus, as the gas sweeps more of the surface of the filter element, the performance of the filter assembly may be even further enhanced.

The gas may also pass through the filter element, e.g., along a gas flow path through the filter medium 18, from the feed side 22 to the filtrate side 24. A substantial portion of the volume of gas, for example, about 50% of the volume or more or about 70% of the volume or more or about 85% of the volume or more or about 90% of the volume or more or about 95% of the volume or more or about 99% of the volume or more of the gas introduced into the filter assembly may flow from the upstream side of the filter element 16 through the filter medium 18 to the filtrate side of the element 16. Again, higher percentages may be more advantageous. The gas passing along the gas flow path through the filter medium, may more effectively lift solids from the surface of the filter element, inhibit their accumulation on or within the filter element, and loosen any solids that do accumulate. Gas flowing along a gas flow path through the filter medium may achieve more intimate contact with the surface of a filter element than gas merely flowing along one side, e.g., an upstream side, of a filter element. For example, the gas passing into the filter medium may more effectively infiltrate accumulated solids at the surface of the element, lifting, dislodging, and loosening otherwise difficult to remove foulants. Additionally, as the gas flows along a gas flow path through the filter element, the gas may loosen and/or dislodge some solids material that may be trapped within the filter medium, for example, solids material intended to pass through the filter medium, but which has become lodged within the medium. Furthermore, the flow of gas both along the filter element and through the filter medium may cause the filter medium to vibrate, further facilitating the prevention of and removal of accumulated foulants. Thus, as more of the gas passes through the filter medium, the performance of the filter assembly may be even further enhanced.

Figure 2:
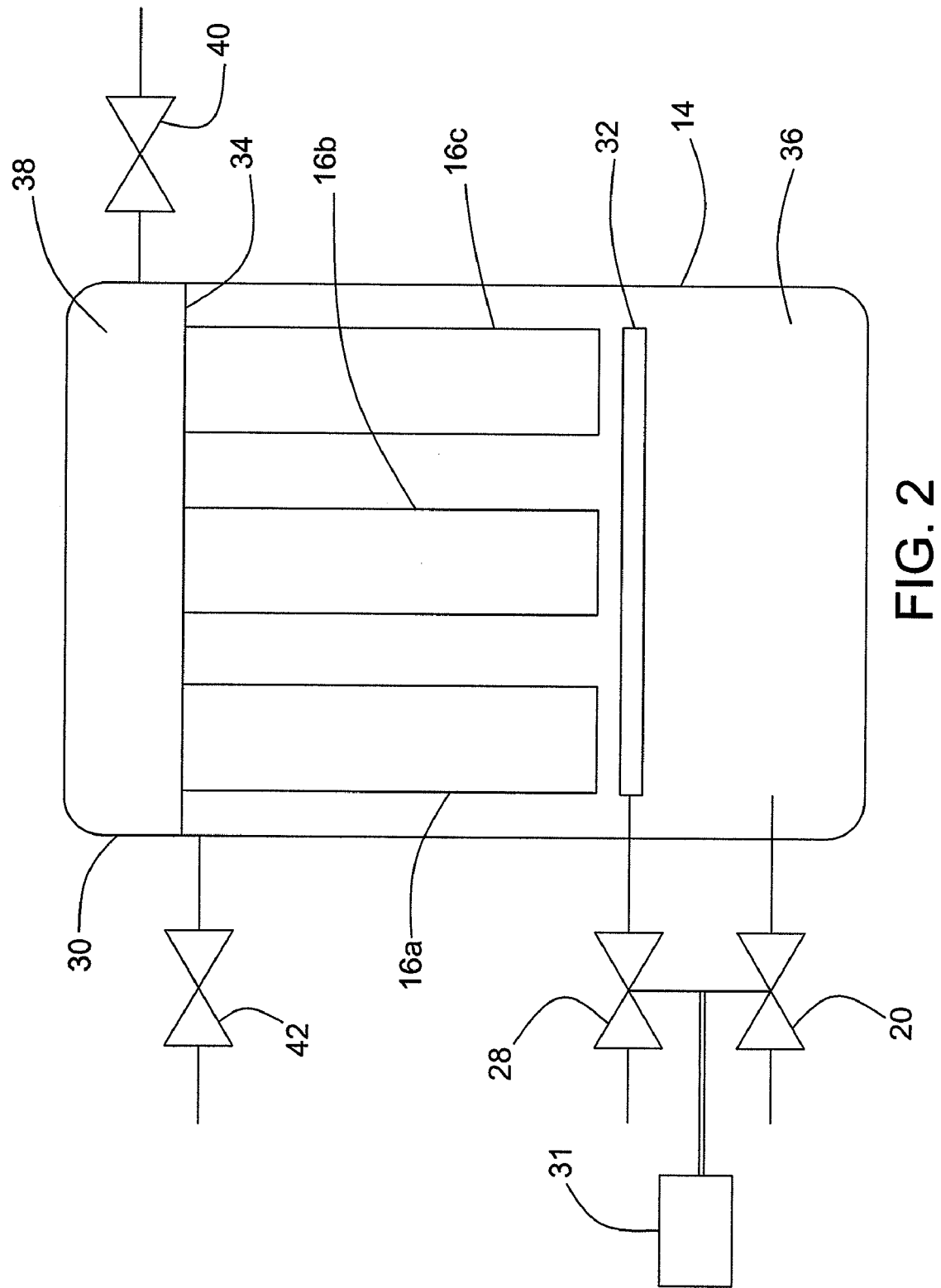
FIG. 2 is a cross-sectional view of a filter assembly.

The gas may be directed to flow into the filter medium 18 in any suitable manner. For example, in some embodiments, a housing 30 may fit closely around the exterior of the filter element 16, e.g., only a small gap may be present between the exterior of the filter element 16 and an interior wall of the housing 30. This small gap may help to direct the gas to flow into the filter medium 18 and along the gas flow path. In some embodiments, the gas may be directed to flow into to the filter element 16 by a gas distributor. A gas distributor may have a variety of suitable configurations. A gas distributor may comprise a pipe or tube with one or more openings that may be positioned in the filter assembly 14 to distribute gas to one or more regions of the filter element 16. The gas distributor may distribute gas only near the bottom of the filter element. Alternatively, the gas distributor may distribute gas to multiple regions of a filter element 16, such as a first region near a lower end of the element and one or more additional regions spaced upwardly from the first region. Additionally or alternatively, a gas distributor may distribute gas to multiple filter elements disposed in a filter assembly. For example, the gas distributor may distribute gas to multiple filter elements arranged in a single housing or in multiple housings. An exemplary filter assembly 14 including multiple filter elements 16a, 16b, 16c distributed in a single housing 30 and a gas distributor 32 is illustrated in FIG. 2.

In some embodiments, gas may accumulate in the filter assembly, e.g., on the feed side of the filter element 16, for example, above a gas-liquid interface. Gas above and below the gas-liquid interface may pass through the filter element as the filtrate passes through the filter element. The position of the gas-liquid interface and/or the volume of accumulated gas may be affected by a variety of factors, including for example, the inlet flow rate of the gas. Gas on the feed fluid side of the filter element may be removed from the filter assembly, for example, through a vent. The vent may allow gas to be removed continuously or intermittently. In some embodiments, it may be preferable to vent the gas only periodically to prevent an excess of gas from exiting through the vent rather than flowing through the filter medium. For many embodiments, the gas is not vented from the feed fluid side of the filter assembly.

After passing through the filter medium to the filtrate side, the filtrate and the gas may be separated from one another. The filtrate and the gas may be separated from one another prior to or after being removed from the filter assembly. For example, the filter assembly may include a filtrate chamber having a filtrate outlet, a separate gas outlet, e.g., a vent, each communicating with the filtrate side of the filter element. The two outlets may be arranged to facilitate the removal of gas through the vent and filtrate through the filtrate outlet. For example, the vent may be disposed in the top of the assembly so that as gas rises, it passes through the filtrate and exits through the vent. Alternatively, the filter assembly 14 may include a single outlet 40 for both the gas and the filtrate, and the gas and the filtrate may be separated after exiting the filter assembly. As seen in FIG. 1, a liquid-gas separator 44 may be disposed downstream of the outlet 40. The liquid-gas separator 44 may separate the filtrate and gas in any suitable manner. For example, the liquid-gas separator may separate the gas from the liquid based on the buoyancy of the gas, allowing the gas to rise through liquid or by centrifugal force, e.g., centrifugal force generated by the flow of fluid through the separator inlet. Other methods of separating liquids and gases are known in the art and may include, for example, coalescing.

The inventive methods may also include additional cleaning regimes, including fluid regeneration methods such as backwash, blowback or scouring arrangements. For example, backwashing may be performed periodically or recurrently, or as needed, based on the measured pressure drop through the filter assembly. In operation, the flow of feed mixture through the filter medium may be halted and a cleaning fluid, such as water, a chemical cleaning agent, a gas or even filtrate, may be directed to flow through the filter medium from the filtrate side to the feed side. The backwash fluid may drive foulants from within the filter medium and/or from the upstream surface of the filter medium. The foulants may then be expelled from the filter assembly with the backwash fluid, for example through a drain or outlet. Alternatively, in some embodiments flow may be stopped and the liquid drained from the assembly and a gas stream may be directed in reverse through the filter medium to dislodge foulants. Sluicing or scraping or other means known in the art may also be utilized.

While many different systems may embody the invention, the exemplary filtration system 10 illustrated in FIG. 1 comprises a dead-end system which generally includes a filter assembly 12 which may be coupled to a source of feed mixture 12, a source of gas 26, and a separator 44. The filter assembly may be variously configured. The filter assembly 14 may include two or more ports for communicating with the feed and gas sources and the separator. For example, the filter assembly may include an inlet port for the feed mixture 20, an inlet port for the gas mixture 28, and an outlet port for the filtrate 40. The filter assembly may also include a vent 42 communicating with the feed side of the filter medium for removing accumulated gas from the assembly 14. The filter assembly may include fewer ports or more ports than illustrated in FIG. 1. For example, the filter assembly 14 may include only one inlet port and one outlet port, the feed inlet and gas inlet being configured as a single port. Alternatively, the filter assembly 14 may include additional ports, such as additional outlet ports, vents, backwashing ports, and/or a drain.

The filter assembly 14 may include one or more filter elements 16. For example, a filter assembly may include one or more filter elements disposed in one or more housings. In an embodiment illustrated in FIG. 1, the filter assembly 14 includes a single filter element 16 surrounded by a housing 30. In other embodiments, multiple filter elements may be disposed in a single housing or multiple filter elements may be disposed in multiple housings. Multiple elements within a housing or within a filter assembly may be the same or different from one another and may be arranged in any suitable configuration, e.g., serially or in parallel. An exemplary filter assembly including multiple filter elements is illustrated in FIG. 2. The filter assembly 14 illustrated in FIG. 2 includes a housing 30 surrounding three filter elements 16a, 16b, 16c arranged in parallel. Although three filter elements are shown, the filter assembly 14 may include any number of filter elements, for example, two, four, five or even more filter elements.

Filter assemblies may include a wide variety of housings to contain the filter element. The filter elements may be contained in the housing in any suitable manner and methods of mounting filter elements in housings are well known in the art. The housing may permanently contain the filter element(s) or the filter element(s) may be removably mounted in the housing 30. In the embodiment illustrated in FIG. 2, the filter elements are mounted below a partition 34, e.g., a tubesheet, dividing the housing 30 into a feed region 36 and a filtrate region 38. Alternatively, the filter elements may be mounted above a partition or the housing may not include a partition at all. The housing 30 may also include additional structures, such as a support for providing additional support to the filter elements. In some embodiments, the housing 30 may fit closely around the exterior of the filter element. For example, only a small gap may exist between the exterior of the filter element 14 and an interior wall of the housing 18. Providing on a small gap between the filter element and housing may facilitate the cleaning action of the gas flowing through the filter element. The housing 18 may be formed from any impermeable material, e.g., a metallic or polymeric material which is chemically compatible with the fluids being filtered and mechanically capable of withstanding the process conditions, e.g., pressure and/or temperature conditions.

The filter element 16 may be structured in a wide variety of ways. For example, the filter element 16 may include a filter medium 18 and may optionally include one or more additional components, such as drainage layers, a core, a surround, and one or more end structures or end caps. The filter element 16 may have any desired configuration. In some embodiments, the filter element 16 may comprise a hollow, generally cylindrical filter element. For example, the filter element 16 may be configured as hollow fiber modules, tube bundles, pleated filter elements, or non-pleated filter elements, including spiral-wound elements.

The filter medium 18 may be in the form of hollow fibers, hollow tubes, a fibrous mass, a pleated or non-pleated sheet of fibrous material or in any other form and may comprise metal, ceramic, glass or natural or synthetic polymers or any other material compatible with the fluid to filtered. The filter medium 18 may have any suitable pore size. Suitable pore sizes may include any pore size that effectively removes unwanted materials and allows gas to pass through the filter medium 18. For example, nominal pore sizes in the micron range or less, e.g., about 0.05 microns or less, to the tens of microns range or more, e.g. the hundreds of microns range, or even larger pore sizes, e.g., up to 5 mm or more, may effectively remove unwanted material in some applications, while allowing gas to pass through the medium 18. The filter medium 18 preferably has a feed side 22, e.g., an upstream side, which fluidly communicates with the source of feed mixture 12 and the source of gas 26, and a filtrate side 24, e.g., a downstream side, which fluidly communicates with the filter assembly outlet 40. In the illustrated embodiment, the feed side 22 of the filter medium 18 is positioned on an exterior of the filter element 16 and the filtrate side 24 of the filter medium 18 is positioned on the interior of the filter element 16, i.e., fluid flow is from the outside-in. Alternatively, in some embodiments, the feed side of the filter medium may comprise the interior of the filter element 16 and the filtrate side of the filter medium may comprise the exterior of the filter element 16, i.e., fluid flow is from the inside-out.

The source of feed mixture 12 may be a separate system or subsystem coupled to the filter assembly 14 in any desired manner or the feed source 12 may be an integral portion of the filtration system 10. The feed source 12 may include a pipe that delivers the feed mixture from a remote process or system or a tank which contains the liquid-solid mixture. Preferably, the source of feed mixture 12 fluidly communicates with the feed side 22 of the filter medium 18. A tank comprising the source of feed mixture may include a stirrer for preventing settling of the solids out of the liquid mixture. The feed mixture may include at least one liquid component and at least one solid component and may have a range of solids concentrations. The present system is particularly advantageous for mixtures having a solids content of from about 5 wt % or less to about 40 wt % or more.

The source of gas 26 may also be a separate system or subsystem coupled to the filter assembly 14 in any desired manner or the gas source 26 may be an integral portion of the filtration system 10. The gas source 26 may comprise a supply of an inert gas, such as nitrogen or argon, a supply of air, for example, compressed air, or any other gas that is compatible with the mixture being filtered. In some embodiments, the gas may include a gaseous form of one or more of the liquids in the feed mixture. For example, the feed mixture may include liquid solvent and the gas may include the solvent in a gaseous phase. In these embodiments, the presence in the gas stream of a gaseous solvent may prevent the solvent in the feed mixture from volatilizing into the gas stream and prevent the loss of solvent in the feed stream. For example, a feed mixture utilized in magnetic tape manufacturing may comprise a mixture of polymer in methylethyl ketone and iron oxides. A gas stream may include methylethyl ketone vapors in equilibrium with the liquid component or nitrogen saturated with methylethyl ketone. A feed mixture utilized in electronic circuit manufacturing may comprise metal powder, e.g., copper, silver nickel, aluminum and/or their alloys in powder form, in isopropylalcohol and a gas stream may include isopropylalcohol vapors in equilibrium with the liquid component. Ceramic slurry feed mixtures may include toluene and/or ketones as solvent, with toluene or ketones also present in the gas stream. In many embodiments, the source of gas 26 communicates with the feed side 22 of the filter medium 18 so that the gas may flow along the surface of the filter medium 18 on the feed side 22 and through the filter medium 18 to the filtrate side 24.

In some embodiments, the filter assembly 14 may include a gas distributor 32 for distributing gas from the gas source 26 to the filter assembly 14. A gas distributor may have a variety of configurations. The gas distributor may comprise a tube or pipe with one or more openings that may be positioned in the filter assembly 14 to direct a gas stream to flow into the filter elements and preferably to flow from the feed side through the filter element to the filtrate side. The gas distributor 32 illustrated in FIG. 2 may distribute gas only to a lower region of multiple filter elements. In some embodiments, a gas distributor may distribute gas to a single region of a single filter element and/or to multiple regions of one or more filter elements.

The filtration system 10 may also include a separator 44 for separating the gas from the filtrate. The separator 44 may comprise any known separator suitable for separating a gas from a liquid. In some embodiments, the separator may comprise a vent or outlet communicating with the filtrate side of the filter assembly. In other embodiments, the separator 44 may comprise a separate system or subsystem positioned downstream of the filter assembly 12. For example, separator systems may comprise a separator chamber including an outlet for gas disposed near the top of the chamber and an outlet for liquid near the bottom of the chamber. The separator chamber may be configured to allow the mixture of gas and liquid to be introduced into the chamber and the gas to rise through the liquid and be removed through the gas outlet. Another exemplary separator may be configured as a tapered tube allowing the mixture of gas and liquid to be tangentially introduced in a manner to form a vortex allowing the gas to condense at the center of the vortex and be removed through a gas outlet. Other liquid-gas separators are known in the art and may include for example, coalescers.

In addition to the above described components, systems for filtration may include additional components. Pumps, valves, and sensors may be used to move the feed fluid, gas, and filtrate through the system. For example, the fluids may be moved through the system in accordance with the commands of a control system. Further, the methods of filtering may be used alone or in combination with other cleaning methods, including fluid regeneration methods such as backwash, blowback or scouring arrangements and/or sluicing or scraping or any other method. Consequently, systems embodying the invention may also include valves, pipes, pumps, and other components to effect the additional cleaning methods.

Figure 3:
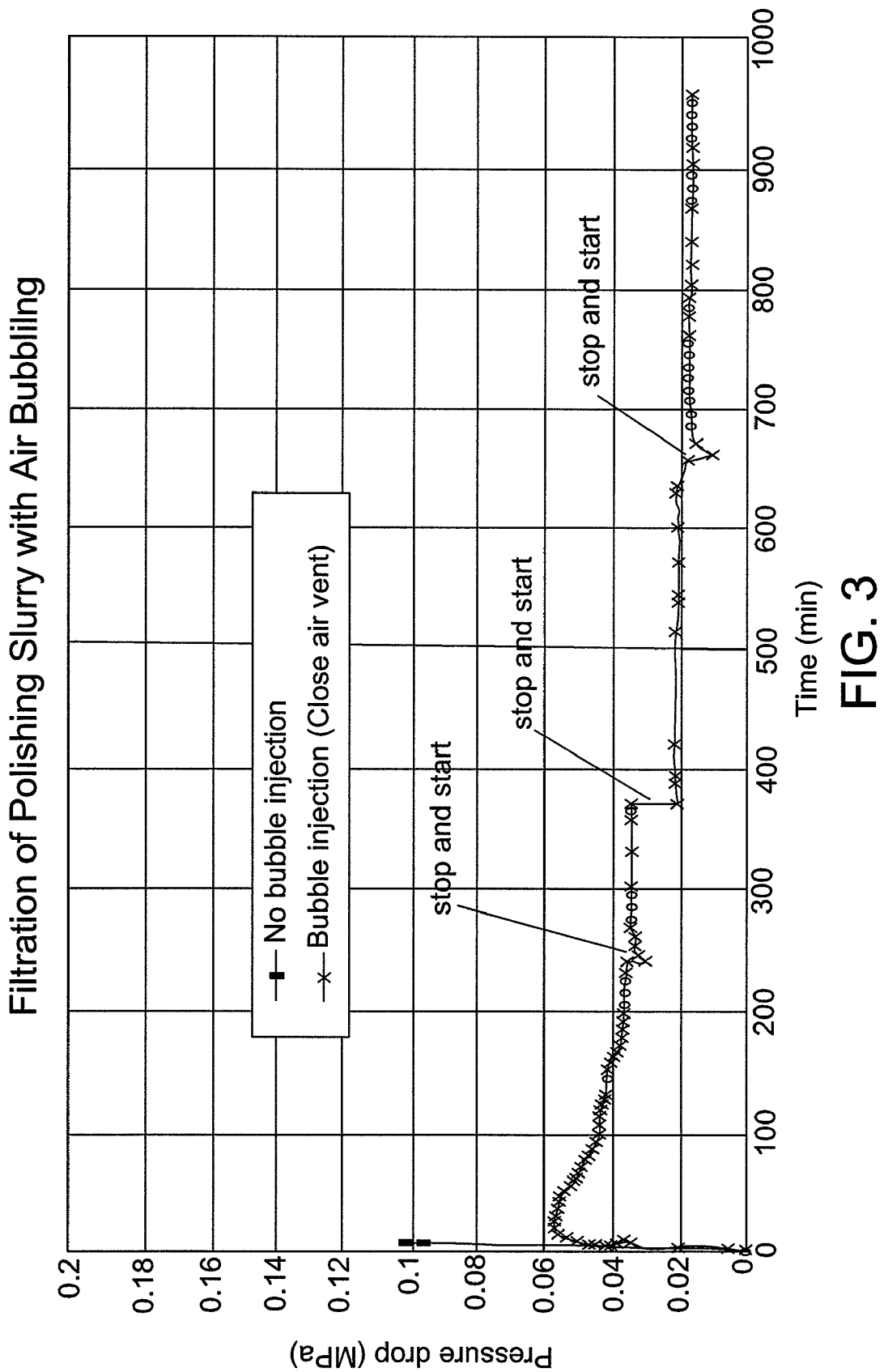
FIG. 3 is a plot of pressure drop through a filter versus time.

The present invention provides significant advantages to liquid-solid mixture filtration methods and systems. As seen in FIG. 3, filtration of a polishing slurry through the system illustrated in FIG. 1 provides an extended filtration time without fouling. A cerium oxide polishing slurry containing 10 wt % solids having a nominal diameter of about 1 micron is filtered through a one inch segment of a PROFILE II Y900 filter having a pore rating of 90 µm at 0 MPa to 0.1 MPa (available from Pall Corporation, East Hills N.Y.). A liquid flow rate of 1 L/min, recirculated through the feed mixture source tank is established and an air flow rate of 1.4 NL/min is passed through the system in one trial (with the vent 38 closed) and no air is used in the comparison trial. As shown in FIG. 3, the filter fouls in only 4 minutes (as represented by the increased pressure drop) in the trial where air was not passed through the filter medium. In contrast, in the trial passing air through the filter medium in accordance with the present invention, the filtration system operates for over 900 minutes without fouling.

While various aspects of the invention have previously been described and illustrated in the Figure, the invention is not limited to these embodiments. For instance, one or more of the features of these embodiments may be eliminated without departing from the scope of the invention. For example, in some embodiments, the filtration system may not include a separator for separating the gas from the filtrate. In these embodiments, the gas and filtrate may be removed from the system without being separated.

Further, one or more features of the embodiments may be modified without departing from the scope of the invention. For example, although the system has been described as suitable for "dead-end" filtration, i.e., filtration where all of the fluid passes through the filter medium to produce filtrate, the invention is not so limited.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A method of filtration comprising:

filtering a feed mixture including at least one liquid component and at least one solid component, wherein filtering the feed mixture includes directing the feed mixture to a feed side of a filter medium and passing filtrate from the feed side through the filter medium to a filtrate side of the filter medium;

while filtering the feed mixture, introducing a gas into the feed mixture, directing a flow of the gas along the feed fluid side of the filter medium, and passing at least a portion of the gas with the filtrate through the filter medium from the feed side to the filtrate side, wherein directing a flow of gas along the feed side of the filter medium includes sweeping the gas along at least 50% of the upstream surface of the feed side loosen accumulated solids on the feed side and form a loose, porous filter cake on the feed side, thereby extending the period of time before fouling, and wherein passing at least a portion of the gas through the filter medium includes passing at least 50% of the gas introduced into the feed mixture through the filter medium; and separating the gas and the filtrate.

2. The method according to claim 1 further comprising venting gas from the feed fluid side of the filter medium.

3. The method according to claim 1 wherein at least one liquid component comprises a solvent and the gas includes the solvent in a gaseous phase.

4. The method according to claim 1 wherein the gas is directed to the filter medium along with the feed mixture.

5. The method according to claim 1 further comprising halting filtration of the feed mixture and performing one or more of backwashing, blowback, scouring, sluicing, and scraping and resuming filtration of the feed mixture.

* * * * *